L. A. DRYNAN.
COMBINED STRAINER AND SIFTER.
APPLICATION FILED MAY 19, 1913.

1,091,737.

Patented Mar. 31, 1914.

2 SHEETS—SHEET 1.

Witnesses
Robert M. Lutphen
A. A. Hind

Inventor
L. A. Drynan

By Watson E. Coleman
Attorney

L. A. DRYNAN.
COMBINED STRAINER AND SIFTER.
APPLICATION FILED MAY 19, 1913.

1,091,737.

Patented Mar. 31, 1914.
2 SHEETS—SHEET 2.

Witnesses
Robert M. Sutphen.
A. I. Hind.

Inventor
L. A. Drynan

By Watson E. Coleman
Attorney

UNITED STATES PATENT OFFICE.

LUCRETIA A. DRYNAN, OF DANFORTH, ILLINOIS.

COMBINED STRAINER AND SIFTER.

1,091,737.

Specification of Letters Patent. Patented Mar. 31, 1914.

Application filed May 19, 1913. Serial No. 768,570.

*To all whom it may concern:*

Be it known that I, LUCRETIA A. DRYNAN, a citizen of the United States, residing at Danforth, in the county of Iroquois and State of Illinois, have invented certain new and useful Improvements in Combined Strainers and Sifters, of which the following is a specification, reference being had to the accompanying drawings.

This invention relates to new and useful improvements in fruit strainers and more particularly to a combined strainer and sifter, the object of the invention being to provide a strainer and sifter which is especially adapted for use in straining fruit after it has been cooked for making a jelly, etc., and also for sifting the fruit in making jams, butters, marmalades and the like.

Another object of the invention is to provide a combined strainer and sifter of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1:
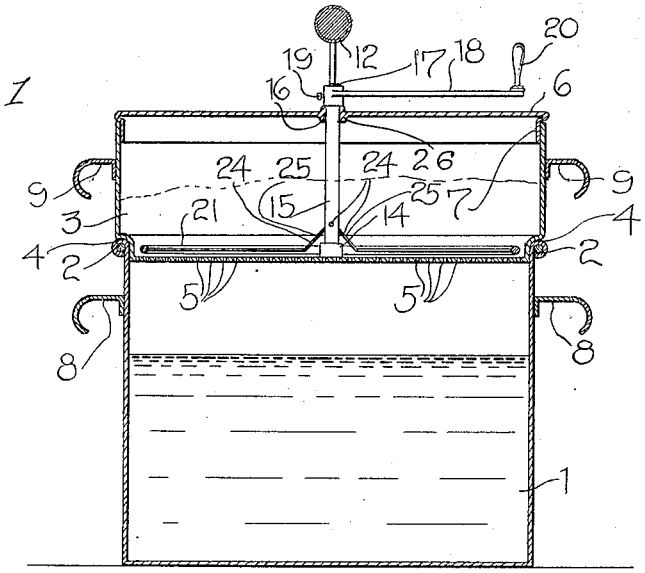
Figure 2:
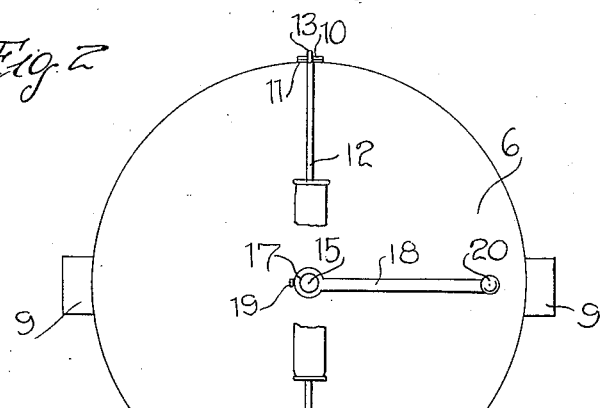
Figure 3:
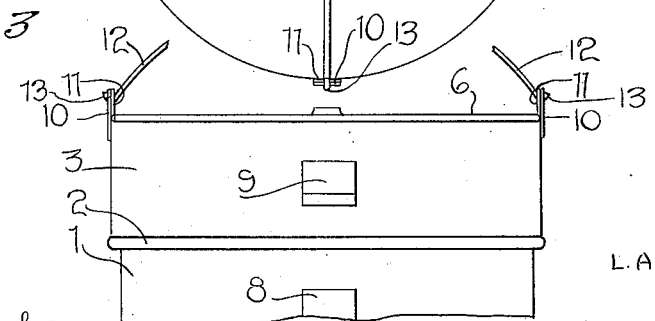
Figure 4:
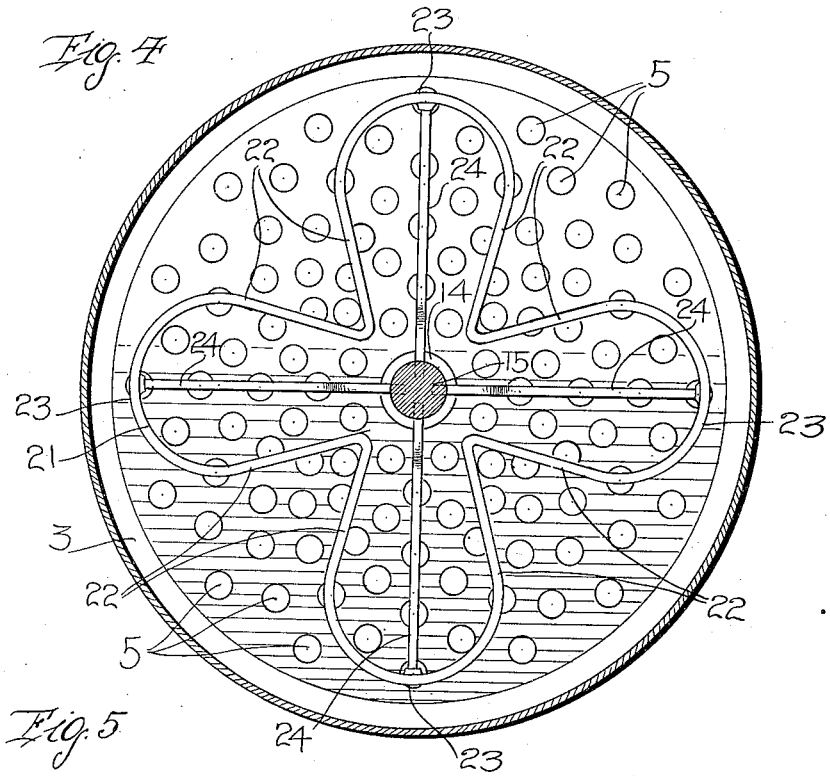
Figure 5:
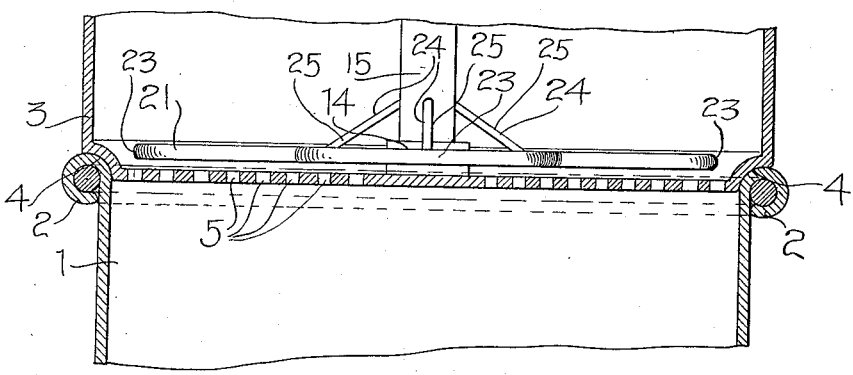

Figure 1 is a vertical sectional view of a combined strainer and sifter constructed in accordance with my invention. Fig. 2 is a top plan view; Fig. 3 is a detail side elevation; Fig. 4 is a transverse sectional view through the upper vessel; Fig. 5 is a detail enlarged vertical sectional view.

Referring more particularly to the drawings, 1 indicates the body of the main part of the vessel which is provided at its upper edge with an annular beading 2, upon which rests the removable vessel 3. The vessel 3 is provided at its lower edge with an annular recess 4 which is adapted to engage over the beading 2 to securely retain the vessel 3 into position upon the upper edge of the vessel 1. From this it will be seen that all lateral movement of the vessel 3 is prevented until the same is moved upwardly in a vertical plane. The vessel 3 preferably comprises the strainer compartment in which the fruits, vegetables, or other materials to be strained and sifted, are to be placed. The bottom of the vessel 3 is provided with a plurality of perforations 5, through which the juice of the fruit passes into the lower vessel 1.

A suitable cover 6 is provided, having a downwardly projecting annular flange 7 formed thereon which is arranged adjacent the periphery of the cover. This flange 7, when the cover is in place, is adapted to be arranged within the upper edge of the vessel 3 so that the same is securely held against any lateral movement whatever. The vessels 1 and 3 are provided at diametrically opposite points with handle members 8 and 9 whereby the same may be readily handled to be conveyed from place to place.

The body 3 is provided adjacent its upper edge with the oppositely disposed loops 10 which are adapted to register with the loops 11 formed upon the cover 6, when the cover is arranged upon the vessel in its operative position. A bail 12 is provided, the ends of which are curved to provide the loops 13 adapted to engage with the loops 10 and 11 to securely retain the cover in position upon the vessel 3. The perforated bottom of the vessel 3 is provided at a central point with a socket 14 which forms a seat for the lower rounded end of the vertical shaft 15, said shaft extending upwardly through an opening 16 formed in the central portion of the cover 6 and provided at its upper end with a reduced portion 17 upon which is mounted the handle 18. The handle 18 is securely held upon the upper end of the shaft by means of a set screw 19 and the outer end of the handle is provided with an upwardly projecting end 20 which is adapted to be readily grasped to rotate the shaft 15.

Secured to the lower end of the shaft 15 and adapted to be rotated within the vessel 3 is a stirring member 21, said stirring member comprising a single length of wire bent to form the radially projecting arms 22, the outer ends of which are rounded off as shown at 23. The arms 22 are securely held in a horizontal position and connected to the lower end of the shaft 15 by means of the rods 24. The rods 24 are secured at one of their ends to the intermediate portion of the outer ends of the arms 22. The inner ends of the rods are bent upwardly, as shown at 25, and rigidly secured to the lower end of the shaft 15, said rods being secured in any suitable manner to the shaft. From this it will be seen that as the shaft 15 is rotated by means of the handle 18, the stirring member 21 will be rotated within the vessel 3 and above the perforated bottom thereof to stir and sift any fruits or vegetables disposed therein.

From the above description it will be readily apparent that the operation of my improved strainer and sifter is as follows:— The fruit or vegetables, after being thoroughly cooked, are placed within the vessel 3, the juice thereof being strained off into the vessel 1 and prepared for making jellies or for bottling the same. The pulp or body of the fruit is then agitated by means of the stirrer 21 so as to break up the pulp and press the finer parts thereof through the perforated bottom of the receptacle into the vessel 1. It will be readily apparent that by rapidly rotating the stirring member 21 within the vessel 3, the pulp of the fruit and vegetables within the vessel will be quickly and readily sifted through the perforated bottom of the vessel into the main vessel 1 where it may be prepared for making jams, butters, marmalade and the like. From this it will be seen that I have provided a simple and durable strainer and sifter which eliminates the necessity of sifting the pulp of the cooked fruits or vegetables in preparing them for the making of jams and the like. It will also be apparent that the device is extremely simple in construction and can be manufactured at a comparatively low cost.

In constructing this device, the same is preferably to be of a material heavily coated inside and out with chemically pure enamel, acid proof, so that the fruit may be allowed to remain within the vessel without the danger of discoloring or otherwise injuring the fruit. It will also be apparent that the cover plate 6 is provided with a reinforcing portion 26, which is arranged around the opening 16 to reinforce the cover at the point where the shaft 15 is located, so as to make it sufficiently strong to withstand the movement of the stirring shaft 15, while being operated.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. In a device of the character described, a stirring member including a shaft provided with operating means, a single length of wire bent to form radially projecting loops disposed around the shaft, such loops being spaced from the shaft at all points, and rods having one end secured to the outer ends of the loops and their opposite ends secured to the shaft, the major portion of the rods being in substantially the same plane as the loops.

2. In a device of the character described, a stirring member including a shaft provided with operating means, a single length of wire bent to form radially projecting loops disposed around the shaft, such loops being spaced from the shaft at all points, and rods having one end secured to the outer ends of the loops and their opposite ends secured to the shaft, the major portion of the rods being in substantially the same plane as the loops, the inner ends of the rods being arranged upon an upwardly directed incline and secured to the shaft at a point above the plane occupied by the loops.

In testimony whereof I hereunto affix my signature in the presence of two witnesses.

LUCRETIA A. DRYNAN.

Witnesses:
 Mrs. P. J. Rhodes,
 M. W. Drynan.

---

Copies of this patent may be obtained for five cents each, by addressing the "Commissioner of Patents. Washington, D. C."